April 4, 1967  F. J. ADAMS  3,312,148
POWER OPERATED STEERING GEAR
Filed March 10, 1965
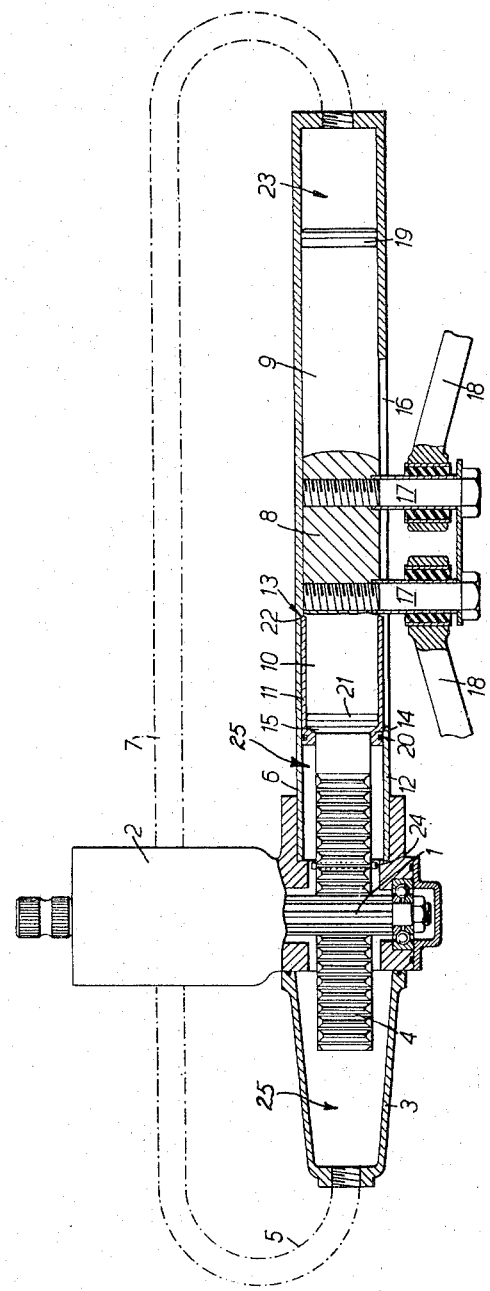
INVENTOR
Frederick J. Adams
BY
Baldwin & Wight
ATTORNEYS (C1. 91—462)

3,312,148
POWER OPERATED STEERING GEAR
Frederick J. Adams, Houghton Regis, near Dunstable, England, assignor to Hydrosteer Limited, Bedfordshire, England
Filed Mar. 10, 1965, Ser. No. 438,647
5 Claims. (Cl. 91—462)

This invention relates to steering mechanism for vehicles of the kind comprising a rack and pinion and a fluid operated power unit which provides power-assistance to the manual steering effort applied to the pinion.

According to the present invention in steering mechanism of the rack and pinion type, the rack is connected to a piston unit operating in the cylinder of a double-acting fluid operated ram, the rack and pinion unit being housed within one of the variable volume chambers to which fluid is supplied to operate the piston.

Thus the length of the unit can be kept to a minimum as no sealing is required between the rack and the fluid operated ram.

Preferably the rack provides at least part of the operative pressure surface on one side of the piston unit and the variable volume chamber in which the rack and pinion unit is arranged may be cylindrical and of substantially the same diameter as the cylinder in which the piston unit operates.

The reduction in length provided by the invention is particularly advantageous in modern automobile construction in which it is important to reduce weight and the space occupied by the operating components. It will of course be appreciated that the operating fluid from the power means will be applied to each side of the piston unit through variable volume chambers.

In a convenient arrangement the rack and pinion unit is carried by a housing to one side of which the cylinder of the ram is connected.

If desired the rack may be arranged at an angle to the pinion associated with it and preferably the connection for a steering assembly extends through an opening in the wall of the ram cylinder.

The present invention may be conveniently applied to an assembly as claimed in copending British patent application No. 27,174/63.

Preferably the arrangement includes a valve mechanism operated in synchronism with movement of the pinion which acts to direct pressure fluid to the variable volume chambers to cause operation of the piston unit.

The invention may be performed in various ways but one specific embodiment will now be described by way of example and with reference to the accompanying drawing in which a rack and pinion unit in accordance with the description and claims of my co-pending application for United States patent, Serial No. 438,646, filed March 10, 1965.

Steering mechanism as shown comprises a rack and pinion unit 1 of known type arranged in a housing 2 which also carries a hydraulic fluid control valve (not shown). The control valve may also be of known type and operated to control the flow of hydraulic fluid to either end of the cylinder in which is arranged a piston unit so that the whole operates a double acting fluid operated ram.

One end of the housing 2 for the rack and pinion unit is provided with an extension 3 into which one end part of the rack 4 can move and to which one side of the fluid from the valve is directed via a conduit or pipe line 5. Also arranged in the rack and pinion housing is a cylindrical member 6 which is axially in line with the extension 3 referred to and into which the other end of the rack 4 can move. This cylindrical member 6 provides the cylinder of the double-acting fluid actuated ram and thus the other side of the fluid from the valve is ducted via a conduit or pipe line 7 to the end of the cylinder remote from the rack and pinion unit.

Arranged within the cylinder member 6 is a piston unit 8 which comprises a piston component 9 which is a sliding fit in the cylinder 6 and the end 10 of which adjacent to the rack 4 is of slightly reduced diameter. This end 10 of reduced diameter is rigidly connected to the adjacent end of the rack 4 and is surrounded by a sleeve 11 within which it is free to slide. The sleeve itself is also arranged to slide within the cylinder 6 but in a portion 12 thereof which is of increased diameter, movement of the sleeve 11 in a direction away from the rack and pinion unit 1 being limited by an annular stop 13 at the junction of the cylinder portion 12 of increased internal diameter and the cylinder portion of lesser diameter. The end of the sleeve 11 adjacent the rack and pinion unit 1 has an inturned flange 14 which can abut against the end surface 15 of the piston component 9. Both flange and piston component are chamfered where they engage to provide a pair of abutment surfaces.

An opening 16 is provided in the lower part of the wall of the cylinder member 6 in the form of an elongated slot through which a pair of bolts 17 can extend into the piston component 9 which can be suitably bushed to carry a pair of track rods 18 from the steering assembly to the vehicle. The bolts 17 and track rods 18 provide steering motion transmitting connections between the piston unit 8 and the vehicle steering assembly, not shown. The position of the bolts 17 in the piston component 9 is such that when the bolts are displaced towards the end of the opening 16 adjacent the rack and pinion unit 1, the end of the piston component 9 remote therefrom is still within the part of the bore of the cylinder member which is not pierced by the opening 16. Similarly when the bolts are displaced to the other end of the slot, remote from the rack and pinion unit, although the end 10 of the piston component 9 adjacent the rack does overlap the slot (as shown in the drawing) the end of the sleeve 11 in which it moves does not. A sealing ring 19 is therefore provided between the piston component 9 and the wall of the cylinder in that part of the piston component which remains in the cylinder when the bolts are adjacent one end of the slot, and a similar sealing ring 20 is arranged between the sleeve 11 and the wall of the cylinder member in that part of the sleeve which remains in the bore of the cylinder member and does not overlap the slot when the bolts are at the other end of the slot. A sealing ring 21 is also provided adjacent the chamfered end of the piston component when it moves within the sleeve.

In operation therefore the space between one end of the piston unit and the extension 3 provides a variable volume chamber 25, and the space in the cylinder 6 between the other end of the piston unit and the end of the cylinder provides a variable volume chamber 23 which is supplied with pressure fluid via the pipe line 7. The double acting piston unit 8 and the housing means comprising the cylinder 6, the housing 2 for the rack and pinion unit 1 and the extension 3 of the housing 2, provide the two variable volume chambers 23 and 25 on opposite sides of the piston unit. When pressure fluid is supplied to the variable volume chamber 35 through the pipe line 5, power fluid surrounds the rack 4 and acts upon it so that the chamfered end 15 of the piston component 9 moves away from the abutment surface on the sleeve 11 which is prevented from moving by the stop 13 at the end of the enlarged portion 12 of the bore of the cylinder member, and the other end of the piston component moves to a point in which it is adjacent the end of the cylinder member. When the rack 4 is moved in the other direction, away from the mid-point as shown in the drawing, hydraulic power fluid will be supplied by the pipe line 7 to the variable volume chamber 23 so that it acts against the sealed end of the piston component 9 and helps to move the piston unit 8 in a direction towards the rack and pinion unit. With this movement sleeve 11 is carried along the bore in the cylinder member by the chamfered abutment surfaces between the sleeve and the piston component until the connection bolts reach the end of the slot.

In order to assist in the return of the sleeve 11 to its central position from the position set forth above a pin 24 is included in the rack bar which can engage the sleeve when the rack bar has moved a predetermined distance into the sleeve.

It will be appreciated that the construction described above allows for a rack and pinion steering mechanism of small dimensions which is partly due to the rack and pinion gear being housed within one of the variable volume operating chambers of the power operated ram.

The invention can of course be applied to constructions in which a sleeve 11 is not included, the piston unit comprising for example a simple piston which is provided with seals at each end, and the ends of which form the end walls of the variable valve chambers.

What I claim is:
1. In a steering mechanism for vehicles, housing means formed with an opening extending from inside said housing means to the outside thereof and further including a cylinder; a double acting piston mounted in said cylinder, said housing means and said piston providing two variable volume chambers on opposite sides of said piston respectively; a rack connected to said piston within said housing means; a pinion meshing with said rack and being operable for moving said rack and said piston in said cylinder, said pinion constituting the input component of a rack and pinion unit and said rack constituting the output component of said rack and pinion unit, said rack and pinion unit being housed within one of said variable volume chambers; means including conduit means for delivering fluid under pressure to said variable volume chambers thereby to provide power assistance to movement of said rack; and steering motion transmission means connected to said piston and extending through said opening in said housing means.

2. Steering mechanism as claimed in claim 1 in which the rack provides at least part of the operative pressure surface on one side of the piston unit.

3. Steering mechanism as claimed in claim 1 in which the variable volume chamber in which the rack and pinion unit is housed is cylindrical and of substantially the same diameter as the cylinder in which the piston unit operates.

4. Steering mechanism as claimed in claim 1 in which the rack and pinion unit is carried by a housing forming a part of said housing means and to one side of which said cylinder is connected.

5. Steering mechanism as claimed in claim 1 including a valve mechanism operated in synchronism with movement of the pinion which acts to direct pressure fluid to the variable volume chambers to cause operation of the piston unit.

References Cited by the Examiner
UNITED STATES PATENTS

| | | | |
|---|---|---|---|
| 812,840 | 2/1906 | Field et al. | 92—52 |
| 1,872,714 | 8/1932 | Farley | 91—375 |
| 2,364,741 | 12/1944 | Merchant | 92—52 |
| 2,681,581 | 6/1954 | Pearson | 92—136 |
| 2,936,739 | 5/1960 | Levenstein et al. | 92—136 |

MARTIN P. SCHWADRON, *Primary Examiner.*
PAUL E. MASLOUSKY, *Examiner.*